US012676094B2

(12) United States Patent
Liao et al.

(10) Patent No.: US 12,676,094 B2
(45) Date of Patent: Jul. 7, 2026

(54) ELECTRONIC DEVICE AND METHOD FOR DRIVING DIFFERENT COLOR SUB-PIXELS USING RESPECTIVE CONTROL SIGNALS

(71) Applicant: InnoLux Corporation, Miao-Li County (TW)

(72) Inventors: Chien-Chih Liao, Miao-Li County (TW); Hsing-Yuan Hsu, Miao-Li County (TW); Po-Yang Chen, Miao-Li County (TW); I-An Yao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/655,305

(22) Filed: May 5, 2024

(65) Prior Publication Data

US 2024/0404446 A1 Dec. 5, 2024

(30) Foreign Application Priority Data

May 31, 2023 (CN) ........................ 202310627604.8

(51) Int. Cl.
*G09G 3/20* (2006.01)
*G09G 3/32* (2016.01)
*G09G 3/3233* (2016.01)

(52) U.S. Cl.
CPC ............ *G09G 3/2003* (2013.01); *G09G 3/32* (2013.01); *G09G 3/3233* (2013.01); *G09G 2300/0426* (2013.01); *G09G 2300/0452* (2013.01); *G09G 2320/0666* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,283,037 B1 * | 5/2019 | Far | G09G 3/32 | |
| 10,460,651 B2 * | 10/2019 | Kim | H10H 20/83 | |
| 2005/0116656 A1 * | 6/2005 | Shin | G09G 3/3233 | 315/169.3 |
| 2007/0080911 A1 * | 4/2007 | Liu | H05B 45/3725 | 345/82 |

(Continued)

FOREIGN PATENT DOCUMENTS

TW 202305774 A 2/2023

*Primary Examiner* — Benjamin C Lee
*Assistant Examiner* — Sarvesh J Nadkarni
(74) *Attorney, Agent, or Firm* — Winston Hsu

(57) ABSTRACT

An electronic device includes a pixel circuit, a data line and two control signal lines. The pixel circuit includes a first sub-pixel circuit and a second sub-pixel circuit, in which a light color of the first sub-pixel circuit is different from a light color of the second sub-pixel circuit. The data line is electrically connected with the first sub-pixel circuit and the second sub-pixel circuit. The two control signal lines are respectively a first control signal line and a second control signal line. The first control signal line is electrically connected with the first sub-pixel circuit for controlling a light-emitting time of the first sub-pixel circuit, and the second control signal line is electrically connected with the second sub-pixel circuit for controlling a light-emitting time of the second sub-pixel circuit.

6 Claims, 7 Drawing Sheets

(56) References Cited

U.S. PATENT DOCUMENTS

| | | | | |
|---|---|---|---|---|
| 2007/0091044 | A1* | 4/2007 | Park | G09G 3/3648 345/88 |
| 2009/0289962 | A1* | 11/2009 | Jun | G09G 3/3611 345/102 |
| 2010/0123401 | A1* | 5/2010 | Park | G09G 3/3426 315/153 |
| 2013/0175514 | A1* | 7/2013 | Han | H10K 59/351 257/40 |
| 2016/0358528 | A1* | 12/2016 | Xie | G09G 3/3208 |
| 2017/0069280 | A1* | 3/2017 | Xu | G09G 3/20 |
| 2020/0301180 | A1* | 9/2020 | Iwamoto | G02F 1/1336 |
| 2022/0028331 | A1* | 1/2022 | Chaji | G09G 3/2014 |

* cited by examiner

ELECTRONIC DEVICE AND METHOD FOR DRIVING DIFFERENT COLOR SUB-PIXELS USING RESPECTIVE CONTROL SIGNALS

BACKGROUND OF THE DISCLOSURE

1. Field of the Disclosure

The present disclosure relates to an electronic device and a method for driving the same, and more particularly, to an electronic device capable of independently controlling sub-pixel circuits of different colors in the same pixel circuit and a method for driving the same.

2. Description of the Prior Art

With the advancement of science and technology, electronic devices with display functions have been widely used in daily life. In the application of existing self-luminous electronic devices, a plurality of pixel circuits are disposed in the display region. Each of the pixel circuits includes sub-pixel circuits of different colors to generate lights of different colors, and images may be displayed by mixing the lights of different sub-pixel circuits.

However, the light emitting elements of the sub-pixel circuits of different colors have different characteristics. The existing self-luminous electronic devices use an identical emission control line to control the sub-pixel circuits of different colors in the same pixel circuit. Under a unified duty ratio, some problems may occur when displaying images. For example, under the low gray-scale display, color shift are likely to occur and cause distortion of the display image. Under the high gray-scale display, the higher driving current cannot be suppressed by increasing the duty ratio, which results in excessively high power consumption.

In order to solve the aforementioned problems, the existing approach is to design different operating voltages for the sub-pixel circuits of different colors and changing the channel width/length of the driving elements. However, the design complexity is increased significantly.

SUMMARY OF THE DISCLOSURE

According to an embodiment of the present disclosure, an electronic device includes a pixel circuit, a data line and two control signal lines. The pixel circuit includes a first sub-pixel circuit and a second sub-pixel circuit, in which a light color of the first sub-pixel circuit is different from a light color of the second sub-pixel circuit. The data line is electrically connected with the first sub-pixel circuit and the second sub-pixel circuit. The two control signal lines are respectively a first control signal line and a second control signal line. The first control signal line is electrically connected with the first sub-pixel circuit for controlling a light-emitting time of the first sub-pixel circuit, and the second control signal line is electrically connected with the second sub-pixel circuit for controlling a light-emitting time of the second sub-pixel circuit.

According to another embodiment of the present disclosure, a method for driving an electronic device is provided. The electronic device includes a pixel circuit and a data line, the pixel circuit includes a first sub-pixel circuit and a second sub-pixel circuit, a light color of the first sub-pixel circuit is different from a light color of the second sub-pixel circuit, and the data line is electrically connected with the first sub-pixel circuit and the second sub-pixel circuit. The method for driving the electronic device includes steps as follows. A first control signal is provided to the first sub-pixel circuit for controlling a light-emitting time of the first sub-pixel circuit. A second control signal is provided to the second sub-pixel circuit for controlling a light-emitting time of the second sub-pixel circuit.

These and other objectives of the present disclosure will no doubt become obvious to those of ordinary skill in the art after reading the following detailed description of the embodiment that is illustrated in the various figures and drawings.

DETAILED DESCRIPTION

Figure 1:
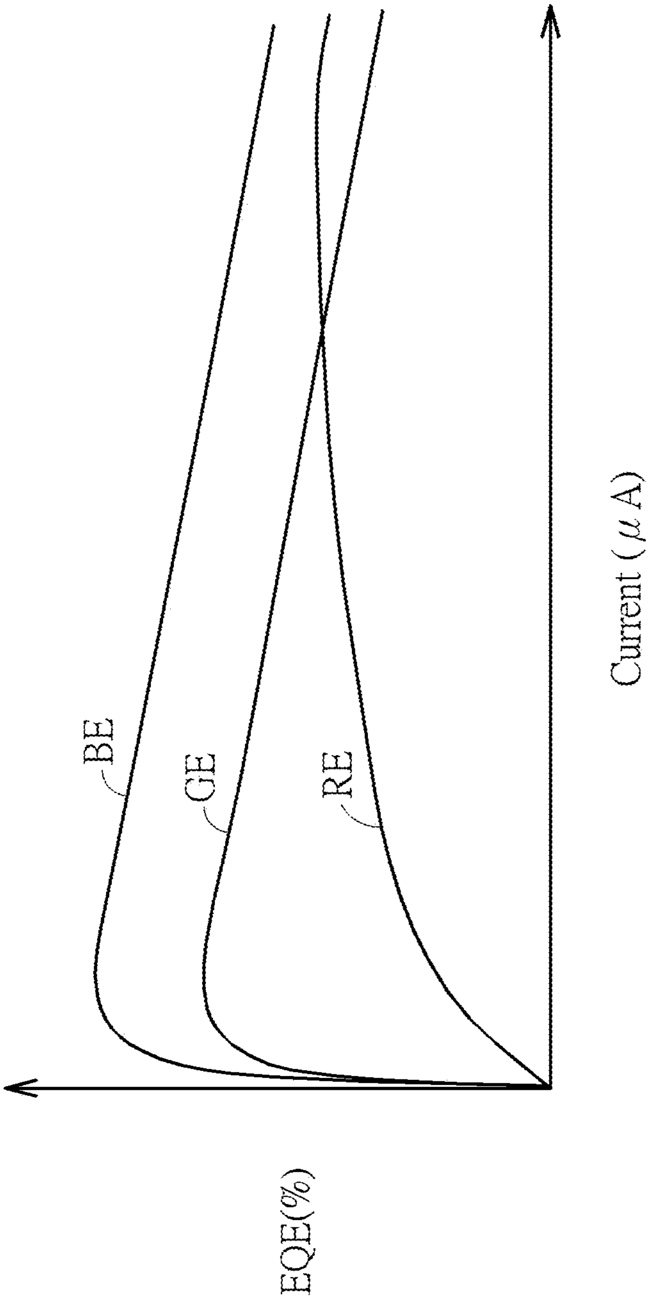
FIG. 1 is a schematic diagram showing a relationship between an external quantum efficiency and a current of a light emitting element according to an embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following specification and claims, the terms “comprise”, “include” and “have” are open-ended fashion, so they should be interpreted as “including but not limited to . . . ”.

The ordinal numbers used in the specification and the appended claims, such as “first”, “second”, etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name. The claims and the description may not use the same terms. Accordingly, a first element in the description may be a second element in the claims.

In addition, when one element or layer is "electrically connected to" another element or layer, it may be understood that the element or layer is directly electrically connected to the another element or layer, and alternatively, another intervening element or layer may be between the element or layer and the another element or layer (indirectly). On the contrary, when the element or layer is "directly electrically connected to" the another element or layer, it may be understood that the element or layer and the another element or layer are electrically connected to each other without through another intervening element or layer. Also, the term "electrically connected" or "coupled" includes means of direct or indirect electrical connection.

As disclosed herein, the terms "about", "substantially", "essentially", or "identical" generally mean within 20%, 10%, 5%, 3%, 2%, 18, or 0.5% of the reported numerical value or range. The quantity disclosed herein is an approximate quantity, that is, without a specific description of "about", "substantially", "essentially", or "identical", the quantity may still include the meaning of "about", "substantially", "essentially", or "identical".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a specific definition in the embodiments of the present disclosure.

In the present disclosure, an electronic device may be bendable, stretchable, rollable, foldable, and/or flexible electronic device, but not limited thereto. The electronic device may include, for example, a light emitting device, a sensing device, a display device, an antenna device, a touch device, a tiled device, or other suitable electronic devices, but not limited thereto. The display device may, for example, be applied to a laptop, a public display, a tiled display, a vehicle display, a touch display, a television, a monitor, a smartphone, a tablet, a light source module, a lighting device or an electronic device applied to the above product, but not limited thereto. The sensing device may, for example, be a sensing device used for detecting change in capacitances, light, heat, or ultrasound, but not limited thereto. The sensing device may, for example, include a biosensor, a touch sensor, a fingerprint sensor, other suitable sensors or any combination of sensors mentioned above. The light emitting element of the display device may, for example, include a light emitting diode, a fluorescent material, a phosphor material, other suitable display mediums, or any combination thereof, but not limited thereto. The light emitting diode may, for example, include an organic light emitting diode (OLED), a mini light emitting diode (mini-LED), a micro light emitting diode (micro LED), a quantum dot light emitting diode (quantum dot LED), other suitable elements or any combination of elements mentioned above, but not limited thereto. The antenna device may, for example, include liquid crystal antenna, or antennas of other types, but not limited thereto. The tiled device may, for example, include a tiled display device or a tiled antenna device, but not limited thereto. Furthermore, the appearance of the electronic device may be rectangular, circular, polygonal, a shape with curved edges, curved or other suitable shapes. The electronic device may have peripheral systems such as a driving system, a control system, a light source system, a shelf system, etc. The electronic device may include electronic units, in which the electronic units may include a passive element and an active element, and for example include a capacitor, a resistor, an inductor, a diode, a transistor, a sensor, etc. It is noted that the electronic device of the present disclosure may be any combination of the above-mentioned devices, but not limited thereto. The electronic device as mentioned herein and shown in the drawings takes a self-luminous display device as an example to describe the present disclosure, but the present disclosure is not limited thereto.

Figure 2:
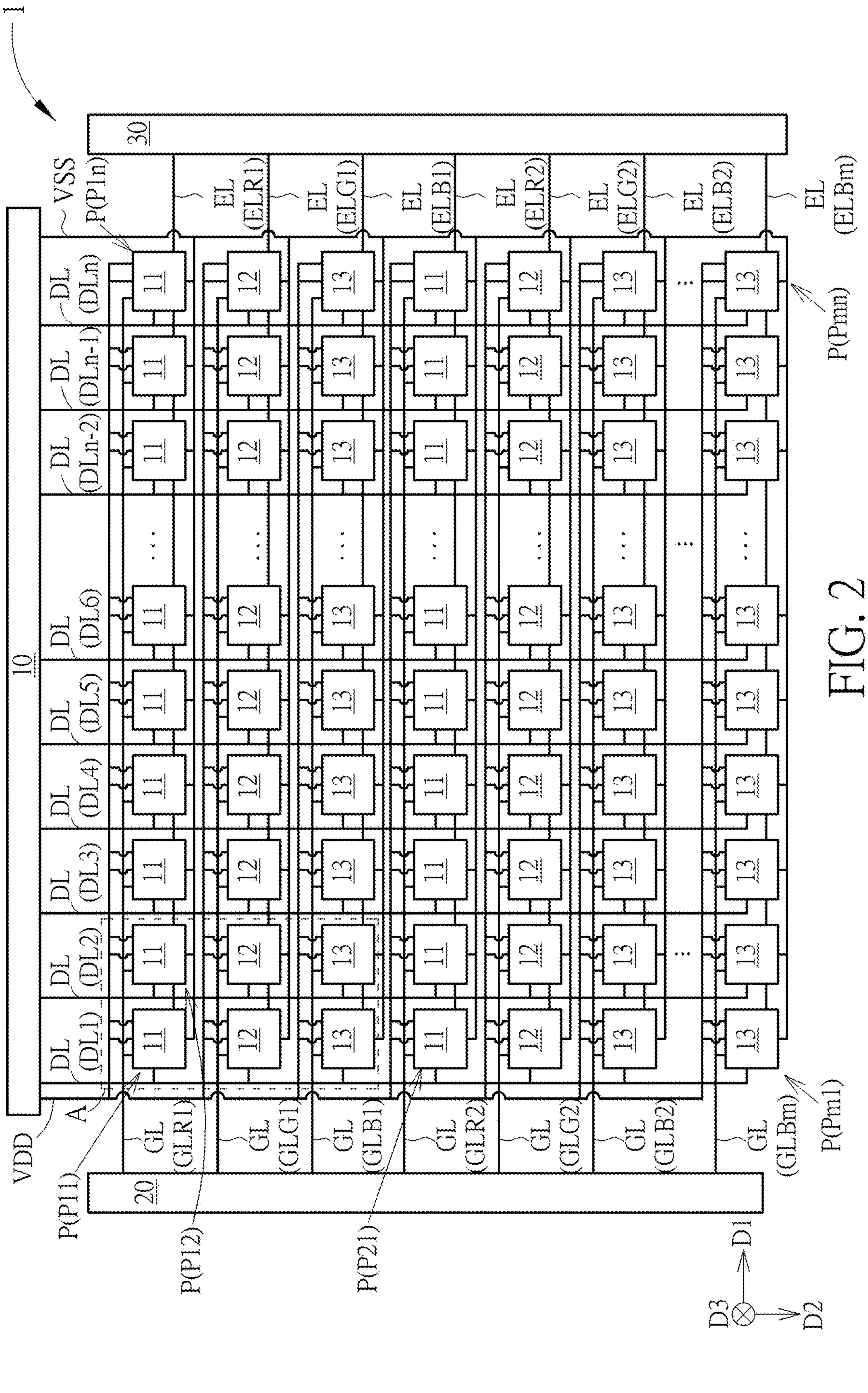
FIG. 2 is a schematic diagram showing a circuit of an electronic device according to an embodiment of the present disclosure.

Refer to FIG. 2, which is a schematic diagram showing a circuit of an electronic device 1 according to an embodiment of the present disclosure. The electronic device 1 may be any kind of display device or any electronic device equipped with a display screen. The electronic device 1 may include a common display device, a tiled display device, a bendable or flexible display device, but not limited thereto. As shown in FIG. 2, the electronic device 1 includes pixel circuits P, data lines DL and control signal lines EL. The pixel circuit P includes a first sub-pixel circuit 11 and a second sub-pixel circuit 12, in which a light color of the first sub-pixel circuit 11 is different from a light color of the second sub-pixel circuit 12. The data line DL is electrically connected with the first sub-pixel circuit 11 and the second sub-pixel circuit 12. The control signal lines EL includes a control signal line ELR1 and a control signal line ELG1. The control signal line ELR1 is electrically connected with the first sub-pixel circuit 11 for controlling the light-emitting time of the first sub-pixel circuit 11. The control signal line ELG1 is electrically connected with the second sub-pixel circuit 12 for controlling the light-emitting time of the second sub-pixel circuit 12. Thereby, the light-emitting times of the sub-pixel circuits of different colors may be flexibly adjusted according to the characteristics of the light emitting elements of the sub-pixel circuits of different colors, which can alleviate problems caused by using a unified duty ratio, such as color shift or high power consumption. For example, the control signal line ELR1 can provide a first control signal EM1 (referring to the first control signal EM1 in FIG. 3 and FIG. 4) to the first sub-pixel circuit 11, and the control signal line ELG1 can provide a second control signal EM2 (referring to the second control signal EM2 in FIG. 3 and FIG. 4). The duty ratio of the first control signal EM1 may be different from the duty ratio of the second control signal EM2.

Specifically, the electronic device 1 may include a plurality of pixel circuits P. Herein, as an example, the number of the pixel circuits P in the first direction D1 is n, and the number of pixel circuits P in the second direction D2 is m, in which n and m are positive integers, and pixel circuits P constitutes an m*n matrix. For the sake of simplicity, only the pixel circuit P11, the pixel circuit P12, the pixel circuit P1*n*, the pixel circuit P21, the pixel circuit Pm1 and the pixel circuit Pmn are labeled, which is exemplary. The pixel circuits P may be disposed in the display region (not shown) of the electronic device 1. Each of the pixel circuits P includes a first sub-pixel circuit 11, a second sub-pixel circuit 12 and a third sub-pixel circuit 13 arranged along the second direction D2. The first sub-pixel circuit 11, the second sub-pixel circuit 12 and the third sub-pixel circuit 13 may include light emitting elements (referring to the light emitting elements EE1, EE2 and EE3 in FIG. 3 and FIG. 4). The light emitting element of the first sub-pixel circuit 11, the light emitting element of the second sub-pixel circuit 12 and the third sub-pixel circuit 13 may be configured to emit lights of different colors. That is, the light color of the first sub-pixel circuit 11, the light color of the second sub-pixel circuit 12, and the light color of the third sub-pixel circuit 13 are different from each other. In the embodiment, the first sub-pixel circuit 11 may be a red sub-pixel circuit, the second sub-pixel circuit 12 may be a green sub-pixel circuit, and the third sub-pixel circuit 13 may be a blue sub-pixel circuit. The light emitting element of the first sub-pixel circuit 11 may be a red LED, the light emitting element of the second sub-pixel circuit 12 may be a green LED, and the light emitting element of the third sub-pixel circuit 13 may be a blue LED. However, the disclosure is not limited thereto. According to actual needs, the light emitting element may be an organic light emitting diode (OLED), a mini light emitting diode (mini LED), a micro light emitting diode (micro LED) or a quantum dot light emitting diode (quantum dot LED). In addition, the number and the colors of the sub-pixel circuits in each of the pixel circuits P may be adjusted according to actual needs, so that the lights of the light emitting elements in each of the pixel circuits P may be mixed with each other to provide the required light color.

The electronic device 1 may include a plurality of data lines DL, which are, from left to right, a data line DL1, a data line DL2, a data line DL3, a data line DL4, a data line DL5, a data line DL6, . . . , a data line DLn−2, a data line DLn−1, and a data line DLn. The extending direction of the data lines DL is parallel to the second direction D2. In the same pixel circuit P, the first sub-pixel circuit 11, the second sub-pixel circuit 12 and the third sub-pixel circuit 13 are arranged along the extending direction of the data line DL. In the same pixel circuit P, the first sub-pixel circuit 11, the second sub-pixel circuit 12 and the third sub-pixel circuit 13 are all electrically connected with the same data line DL. That is, in the same pixel circuit P, the first sub-pixel circuit 11, the second sub-pixel circuit 12, and the third sub-pixel circuit 13 share the same data line DL. Multiple pixel circuits P in the same column are electrically connected with the same data line DL. That is, the pixel circuits P in the same column share the same data line DL. For example, the pixel circuit P11, the pixel circuit P21, . . . , and the pixel circuit Pm1 in the first column are electrically connected with the data line DL1. The conventional electronic device that uses different data lines DL to control the sub-pixel circuits of different colors in the same pixel circuit P requires a multiplexer (MUX) for switching the data lines DL. Compared with the conventional electronic device, the present disclosure can omit the multiplexer, which is beneficial to reduce the width of the peripheral region of the electronic device 1.

The electronic device 1 may include a plurality of gate lines GL (also called scan lines), which are, from top to bottom, a gate line GLR1, a gate line GLG1, a gate line GLB1, a gate line GLR2, a gate line GLG2, a gate line GLB2, . . . , and a gate line GLBm. The extending direction of gate lines GL are parallel to the first direction D1. The extending direction of gate lines GL is perpendicular to the extending direction of data lines DL. That is, in the same pixel circuit P, the first sub-pixel circuit 11, the second sub-pixel circuit 12 and the third sub-pixel circuit 13 are arranged in a direction perpendicular to the extending direction of gate lines GL. However, the present disclosure is not limited thereto. In other embodiments, the extending direction of the gate lines GL may not be perpendicular to the extending direction of the data lines DL.

In the same pixel circuit P, the first sub-pixel circuit 11, the second sub-pixel circuit 12 and the third sub-pixel circuit 13 are electrically connected with different gate lines GL. The gate line GLR1 is electrically connected with the first sub-pixel circuits 11 of the pixel circuit P11, the pixel circuit P12, . . . , and the pixel circuit P1*n* in the first row. The gate line GLG1 is electrically connected with the second sub-pixel circuits 12 of the pixel circuit P11, the pixel circuit 12, . . . , and the pixel circuit P1*n* in the first row. The gate line GLB1 is electrically connected with the third sub-pixel circuits 13 of the pixel circuit P11, the pixel circuit P12, . . . , and the pixel circuit P1*n* in the first row. That is, the first sub-pixel circuits 11 of the pixel circuits P in the same row shares the same gate line GL, the second sub-pixel circuits 12 of the pixel circuits P in the same row shares the same gate line GL, and the third sub-pixel circuits 13 of the pixel circuits P in the same row shares the same gate lines GL.

The electronic device 1 may include a plurality of control signal lines EL, which are, from top to bottom, a control signal line ELR1, a control signal line ELG1, a control signal line ELB1, a control signal line ELR2, a control signal line ELG2, a control signal line ELB2, . . . , and a control signal line ELBm. The extending direction of the control signal lines EL is parallel to the first direction D1. The extending direction of the control signal lines EL is perpendicular to the extending direction of the data lines DL. That is, in the same pixel circuit P, the first sub-pixel circuit 11, the second sub-pixel circuit 12 and the third sub-pixel circuit 13 are arranged along a direction perpendicular to the extending direction of the control signal lines EL. However, the present disclosure is not limited thereto. In other embodiments, the extending direction of the control signal lines EL may not be perpendicular to the extending direction of the data lines DL.

Taking the pixel circuit P11 as an example, the control signal line ELR1 is electrically connected with the first sub-pixel circuit 11 for controlling the light-emitting time of the first sub-pixel circuit 11, the control signal line ELG1 is electrically connected with the second sub-pixel circuit 12 for controlling the light-emitting time of the second sub-pixel circuit 12, and the control signal line ELB1 is electrically connected with the third sub-pixel circuit 13 for controlling the light-emitting time of the third sub-pixel circuit 13. The control signal line ELR1 can provide the first control signal EM1 (referring to the first control signal EM1 in FIG. 3 and FIG. 4) to the first sub-pixel circuit 11, the control signal line ELG1 can provide the second control signal EM2 (referring to the second control signal EM2 in FIG. 3 and FIG. 4) to the second sub-pixel circuit 12, the control signal line ELB1 can provide the third control signal EM3 (referring to the third control signal EM3 in FIG. 3 and FIG. 4) to the third sub-pixel circuit 13, and the duty ratio of the first control signal EM1, the duty ratio of the second control signal EM2 and the duty ratio of the third control signal EM3 may be different from each other. The first control signal EM1, the second control signal EM2 and the third control signal EM3, for example, may be pulse width modulation (PWM) signals.

The control signal line ELR1 is electrically connected with the first sub-pixel circuits 11 of the pixel circuit P11, the pixel circuit P12, . . . , and the pixel circuit P1*n* in the first row. The control signal line ELG1 is electrically connected with the second sub-pixel circuits 12 of the pixel circuit P11, the pixel circuit P12, . . . , and the pixel circuit P1*n* in the first row. The control signal line ELB1 is electrically connected with the third sub-pixel circuits 13 of the pixel circuit P11, the pixel circuit P12, . . . , and the pixel circuit P1*n* in the first row. That is, the first sub-pixel circuits 11 of the pixel circuits P in the same row share the same control signal line EL, the second sub-pixel circuits 12 of the pixel circuits P in the same row share the same control signal line EL, and the third sub-pixel circuits 13 of the pixel circuits P in the same row share the same control signal line EL. The same control signal line EL may be configured to control the sub-pixel circuits of the same color.

Please refer to FIG. 1, which is a schematic diagram showing a relationship between external quantum efficiency (EQE) and a current of a light emitting element according to an embodiment of the present disclosure. In FIG. 1, the curve RE, the curve GE and the curve BE are the EQE versus current curves of a red LED, a green LED and a blue LED, respectively. As shown in FIG. 1, the LEDs of different colors have different luminous characteristics. In the present disclosure, by using different control signal lines EL to control the first sub-pixel circuit 11, the second sub-pixel circuit 12 and the third sub-pixel circuit 13 of different colors in the same pixel circuit P, it can flexibly adjust the light-emitting times of the sub-pixel circuits of different colors according to the characteristics of the light emitting elements of the sub-pixel circuits of different colors, which can alleviate problems caused by using a unified duty ratio, such as color shift or high power consumption. For example, under the low gray-scale display, the duty ratios of the light emitting elements of different colors can be lowered flexibly (the driving current is increased), which can alleviate the problem of color shift caused by the low driving current. Under the high gray-scale display, the duty ratios of the light emitting elements of different colors can be increased flexibly (the driving current is lowered), which can alleviate the problem of high power consumption caused by the high driving current.

In FIG. 2, the electronic device 1 may include a power line VDD and a ground potential line VSS to be electrically connected with each of the pixel circuits P. The electronic device 1 may include a data driver/power source 10, a gate driver 20 and a control signal driver 30. The data driver/power source 10 is configured for providing a data signal to a selected data line DL and/or a voltage to the power line VDD and the ground potential line VSS, so as to control the voltage of the sub-pixel circuit. The gate driver 20 is configured to provide a scan signal to a selected gate line GL to control the switch on/off of the sub-pixel circuit. The control signal driver 30 is configured for providing a control signal to a selected sub-pixel circuit to control the light-emitting time of the sub-pixel circuit.

In FIG. 2, the data lines DL and other lines, such as the gate lines GL, the control signal lines EL, the power line VDD and the ground potential line VSS, are disposed in different conductive layers, so that the bridge joint at the intersection points between the data lines DL and other lines are not shown in FIG. 2. However, the present disclosure is not limited thereto. Different lines, such as the data lines DL, the gate lines GL, the control signal lines EL, the power line VDD and the ground potential line VSS of the electronic device 1 may be formed in the same or different conductive layers.

Figure 3:
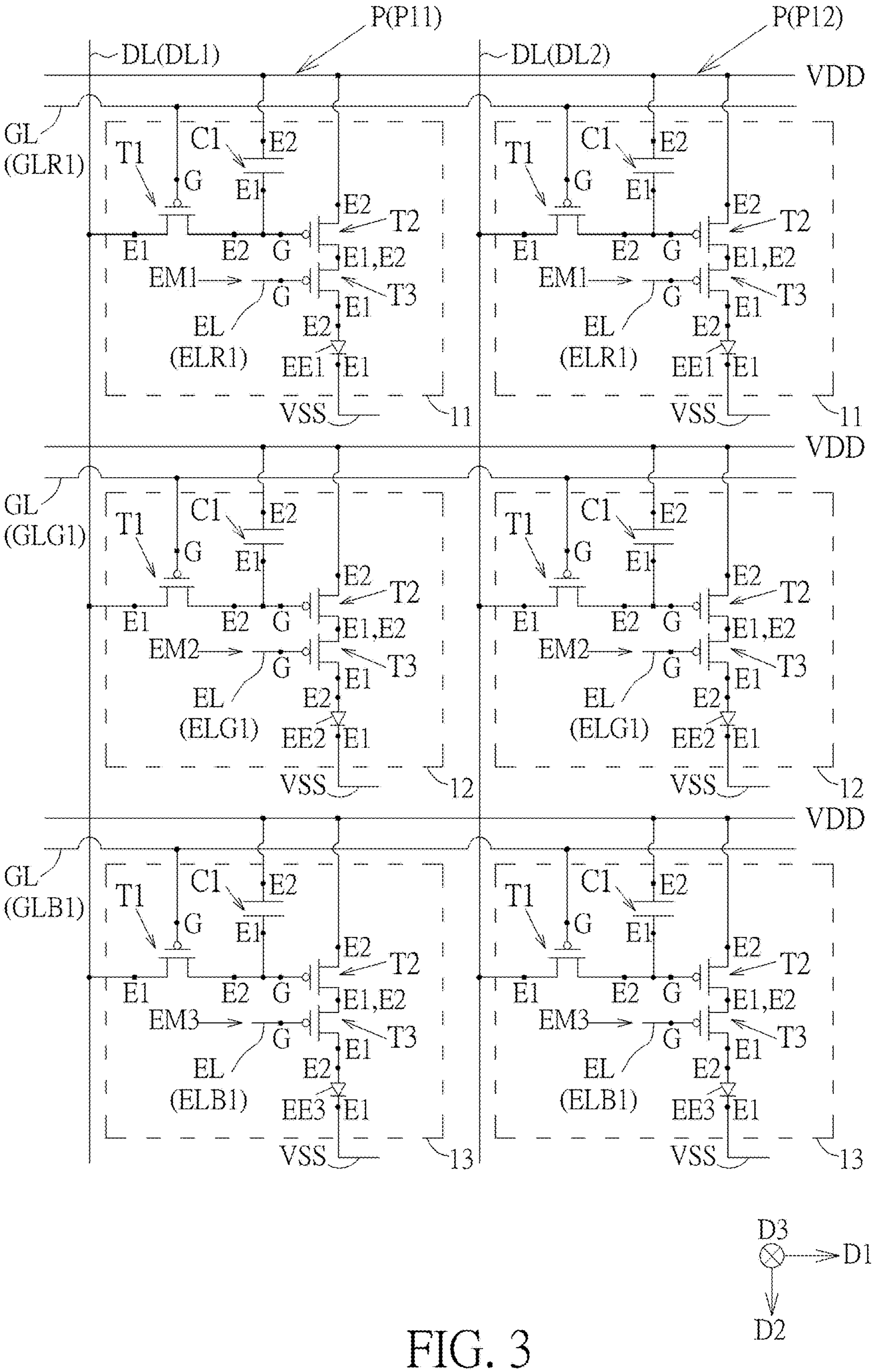
FIG. 3 is a partially enlarged schematic diagram of an electronic device according to an embodiment of the present disclosure.

Please refer to FIG. 3, which is a partially enlarged schematic diagram of an electronic device 1 according to an embodiment of the present disclosure. Specifically, it is a partially enlarged schematic diagram of the electronic device 1 in the third direction D3, and may be corresponding to the portion A in FIG. 2, in which the third direction D3 is perpendicular to the first direction D1 and the second direction D2. The first sub-pixel circuit 11 includes a first transistor T1, a second transistor T2, a third transistor T3, a storage capacitor C1 and a light emitting element EE1. That is, the first sub-pixel circuit 11 is configured as a 3T1C (three transistors and one storage capacitor) circuit structure. Each of the first transistor T1, the second transistor T2, and the third transistor T3 may have a control end G, a first end E1, and a second end E2. The first transistor T1, the second transistor T2, and the third transistor T3 may be P-type transistors, and the control end G may be the gate of a P-type transistor. One of the first end E1 and the second end E2 may be the source of the P-type transistor, and the other one of the first end E1 and the second end E2 may be the drain of the P-type transistor, but not limited thereto. In some embodiments, the first transistor T1, the second transistor T2, and the third transistor T3 may also be N-type transistors. The structure of the transistor may include, for example, a thin film transistor, a metal oxide semiconductor field effect transistor, or other types of transistor. Since the electron mobilities of different semiconductor materials are different, the electronic device 1 can provide a better power saving or display effects by selecting suitable semiconductor materials for different thin film transistors. In one embodiment, the semiconductor layer of the second transistor T2 may include low temperature poly-silicon (LTPS), and the semiconductor layer of at least one of the first transistor T1 and the third transistor T3 may include a metal oxide. In another embodiment, the semiconductor layers of the first transistor T1, the second transistor T2, and the third transistor T3 may all include low temperature poly-silicon. In yet another embodiment, the semiconductor layers of the first transistor T1, the second transistor T2 and the third transistor T3 may all include metal oxides. According to the above description, the semiconductor layers of the first transistor T1, the second transistor T2 and the third transistor T3 of the present disclosure may use the same material or different materials.

In the first sub-pixel circuit 11, the control end G of the first transistor T1 is electrically connected with the gate line GLR1, the first end E1 of the first transistor T1 is electrically connected with the data line DL1, and the second end E2 of the first transistor T1 is electrically connected with the control end G of the second transistor T2 and the first end E1 of the storage capacitor C1. The control end G of the second transistor T2 is electrically connected with the second end E2 of the first transistor T1 and the first end E1 of the storage capacitor C1, the second end E2 of second transistor T2 is electrically connected with the power line VDD, and the first end E1 of the second transistor T2 is electrically connected with the second end E2 of the third transistor T3. The control end G of the third transistor T3 is electrically connected with the control signal line ELR1, the second end E2 of the third transistor T3 is electrically connected with the first end E1 of the second transistor T2, and the first end E1 of the third transistor T3 is electrically connected with the second end E2 of the light emitting element EE1. The second end E2 of the storage capacitor C1 is electrically connected with the power line VDD, and the first end E1 of the light emitting element EE1 is electrically connected with the ground potential line VSS.

The circuit operation of the first sub-pixel circuit 11 is described as follows. First, the gate driver 20 sends a scan signal to the gate line GLR1 to switch on the first transistor T1. The data driver/power source 10 sends a data signal to store in the storage capacitor C1 through the data line DL1. The second transistor T2 determines the magnitude of driving current provided to the light emitting element EE1 based on the data signal stored in the storage capacitor C1. The control signal driver 30 sends a first control signal EM1 to the control end G of the third transistor T3 through the control signal line ELR1, so as to control the light-emitting time of the light emitting element EE1.

The circuit configurations of the second sub-pixel circuit 12 and the third sub-pixel circuit 13 are substantially the same as that of the first sub-pixel circuit 11. The main difference is that the light color of light emitting element EE1 of the first sub-pixel circuit 11, the light color of the light emitting element EE2 of the second sub-pixel circuit 12 and the light color of the light emitting element EE3 of the third sub-pixel circuit 13 are different. In addition, the first control signal EM1, the second control signal EM2 and the third control signal EM3 are independent of each other.

Figure 4:
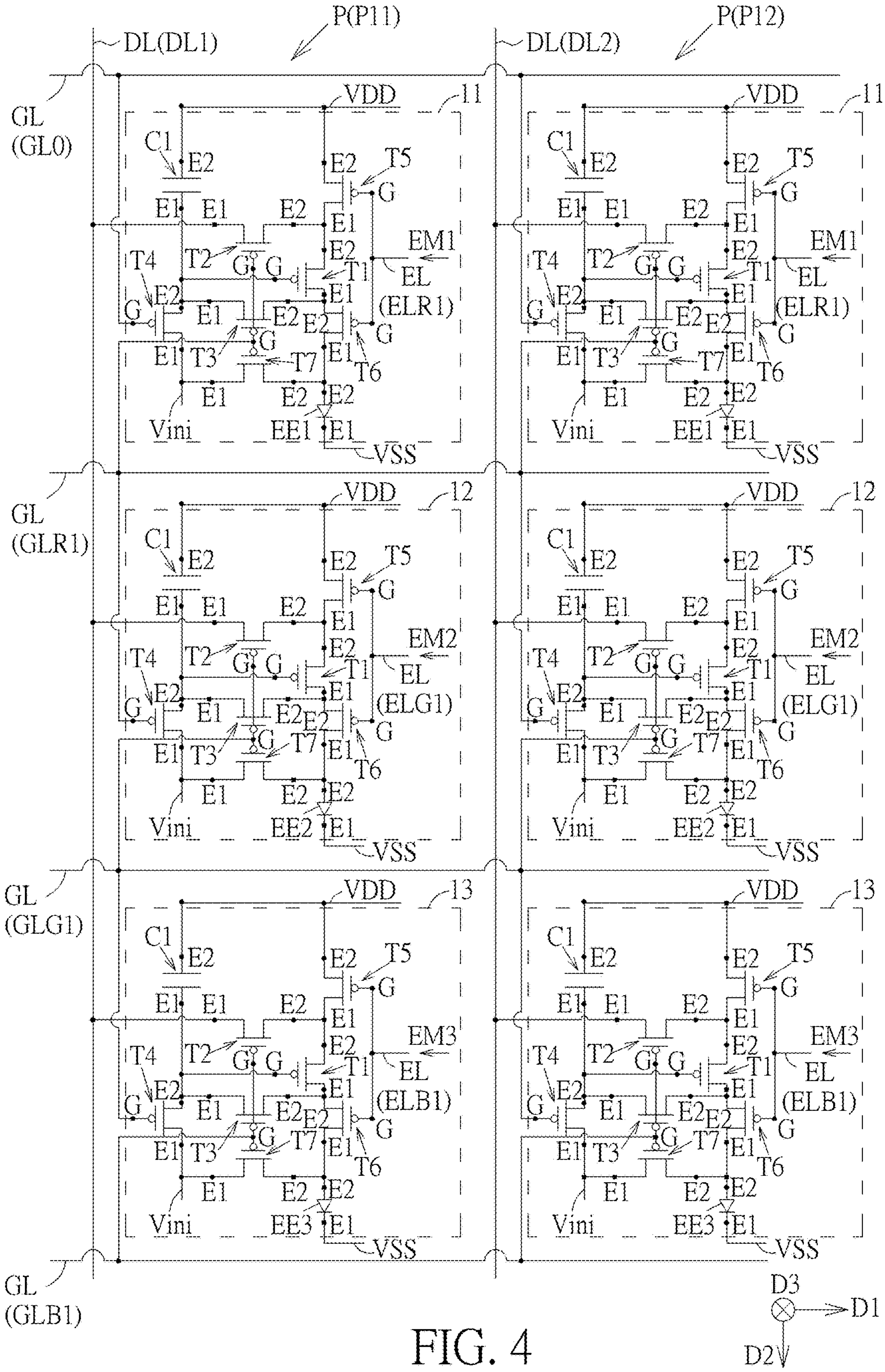
FIG. 4 is a partially enlarged schematic diagram of an electronic device according to another embodiment of the present disclosure.

Please refer to FIG. 4, which is a partially enlarged schematic diagram of an electronic device according to another embodiment of the present disclosure. In FIG. 4, the first sub-pixel circuit 11 includes a first transistor T1, a second transistor T2, a third transistor T3, a fourth transistor T4, a fifth transistor T5, a sixth transistor T6, a seventh transistor T7, a storage capacitor C1 and a light emitting element EE1. That is, the first sub-pixel circuit 11 is configured as a 7T1C (seven transistors and one storage capacitor) circuit structure. Compared with the circuit structure of 3T1C, the circuit structure of 7T1C can provide a compensation effect with more transistors. Accordingly, the image quality, contrast or other aspects of the electronic device can be improved.

Specially, compared with the electronic device 1 in FIG. 2, the electronic device in the embodiment may further include a gate line GL0 and an initial voltage line Vini. The initial voltage line Vini may be electrically connected with the data driver/power source 10 (not shown). Each of the first transistor T1 to the seventh transistor T7 may have a control end G, a first end E1 and a second end E2. The first transistor T1 to the seventh transistor T7 may be P-type transistors, and the control end G may be the gate of the P-type transistor. One of the first end E1 and the second end E2 may be the source of the P-type transistor, and the other one of the first end E1 and the second end E2 may be the drain of the P-type transistor, but not limited thereto. In some embodiments, the first transistor T1 to the seventh transistor T7, for example, may also be N-type transistors. The structure of the transistor may include, for example, a thin film transistor, a metal oxide semiconductor field effect transistor, or other types of transistor.

The control end G of the fourth transistor T4 is electrically connected with the gate line GL0, the first end E1 of the fourth transistor T4 is electrically connected with the initial voltage line Vini and the first end E1 of the seventh transistor T7, and the second end E2 of the fourth transistor T4 is electrically connected with the first end E1 of the third transistor T3, the control end G of the first transistor T1 and the first end E1 of the storage capacitor C1. The control end G of the second transistor T2 is electrically connected with the control end G of the third transistor T3, the control end G of the seventh transistor T7 and the gate line GLR1, the first end E1 of the second transistor T2 is electrically connected with the data line DL1, and the second end E2 of the second transistor T2 is electrically connected with the first end E1 of the fifth transistor T5 and the second end E2 of the first transistor T1. The control end G of the third transistor T3 is electrically connected with gate line GLR1, the control end G of the seventh transistor T7 and the control end G of the second transistor T2, the first end E1 of the third transistor T3 is electrically connected with the second end E2 of the fourth transistor T4, the first end E1 of the storage capacitor C1 and the control end G of the first transistor T1, and the second end E2 of the third transistor T3 is electrically connected with the first end E1 of the first transistor T1 and the second end E2 of the sixth transistor T6. The control end G of the seventh transistor T7 is electrically connected with the control end G of the third transistor T3, the gate line GLR1 and the control end G of the second transistor T2, the first end E1 of the seventh transistor T7 is electrically connected with the first end E1 of the fourth transistor T4 and the initial voltage line Vini, and the second end E2 of the seventh transistor T7 is electrically connected with the first end E1 of the sixth transistor T6 and the second end E2 of the light emitting element EE1. The control end G of the first transistor T1 is electrically connected with the second end E2 of the fourth transistor T4, the first end E1 of the third transistor T3 and the first end E1 of the storage capacitor C1, the first end E1 of the first transistor T1 is electrically connected with the second end E2 of the sixth transistor T6 and the second end E2 of the third transistor T3, and the second end E2 of the first transistor T1 is electrically connected with the second end E2 of the second transistor T2 and the first end E1 of the fifth transistor T5. The control end G of the fifth transistor T5 is electrically connected with the control signal line ELR1 and the control end G of the sixth transistor T6, the first end E1 of the fifth transistor T5 is electrically connected with the second end E2 of the second transistor T2 and the second end E2 of the first transistor T1, and the second end E2 of the fifth transistor T5 is electrically connected with the power line VDD. The control end G of the sixth transistor T6 is electrically connected with the control signal line ELR1 and the control end G of the fifth transistor T5, the first end E1 of the sixth transistor T6 is electrically connected with the second end E2 of the seventh transistor T7 and the second end E2 of the light emitting element EE1, and the second end E2 of the sixth transistor T6 is electrically connected with the first end E1 of the first transistor T1 and the second end E2 of the third transistor T3. The second end E2 of the storage capacitor C1 is electrically connected with the power line VDD, and the first end E1 of the light emitting element EE1 is electrically connected with the ground potential line VSS.

The circuit operation of the first sub-pixel circuit 11 is described as follows. The gate driver 20 sends a scan signal to the gate line GL0 to switch on the fourth transistor T4 to reset the control end G of the first transistor T1. The gate driver 20 sends a scan signal to gate line GLR1 to switch on the third transistor T3, the second transistor T2 and the seventh transistor T7, in which the seventh transistor T7 is switched on for resetting the second end E2 of the light emitting element EE1. When the third transistor T3 and the second transistor T2 are switched on, the data signal sent by the data driver/power source 10 through the data line DL1 may be stored in the storage capacitor C1 through the path of the second transistor T2, the first transistor T1, and the third transistor T3. The first transistor T1 determines the magnitude of the driving current provided to the light emitting element EE1 based on the data signal stored in the storage capacitor C1. The control signal driver 30 sends the first control signal EM1 to the control end G of the fifth transistor T5 and the control end G of the sixth transistor T6 through the control signal line ELR1, so as to control the light-emitting time of the light emitting element EE1.

The circuit configurations of the second sub-pixel circuit 12 and the third sub-pixel circuit 13 are substantially the same as that of the first sub-pixel circuit 11. The main difference is that the light color of light emitting element EE1 of the first sub-pixel circuit 11, the light color of the light emitting element EE2 of the second sub-pixel circuit 12 and the light color of the light emitting element EE3 of the third sub-pixel circuit 13 are different. In addition, the first control signal EM1, the second control signal EM2 and the third control signal EM3 are independent of each other.

Compared with the circuit structure of 3T1C in FIG. 3, the circuit structure of 7T1C in FIG. 4 has the function of resetting and compensating the first transistor T1, which can correct the offset of the threshold voltage (Vth) of the first transistor T1 due to long-term use. The circuit structure of 3T1C structure in FIG. 3 and the circuit structure of 7T1C in FIG. 4 are exemplary, and the present disclosure is not limited thereto. The first sub-pixel circuit 11, the second sub-pixel circuit 12 and the third sub-pixel circuit 13 may be configured as other circuit structures, such as the circuit structure of 7T2C or 8T2C.

Figure 5:
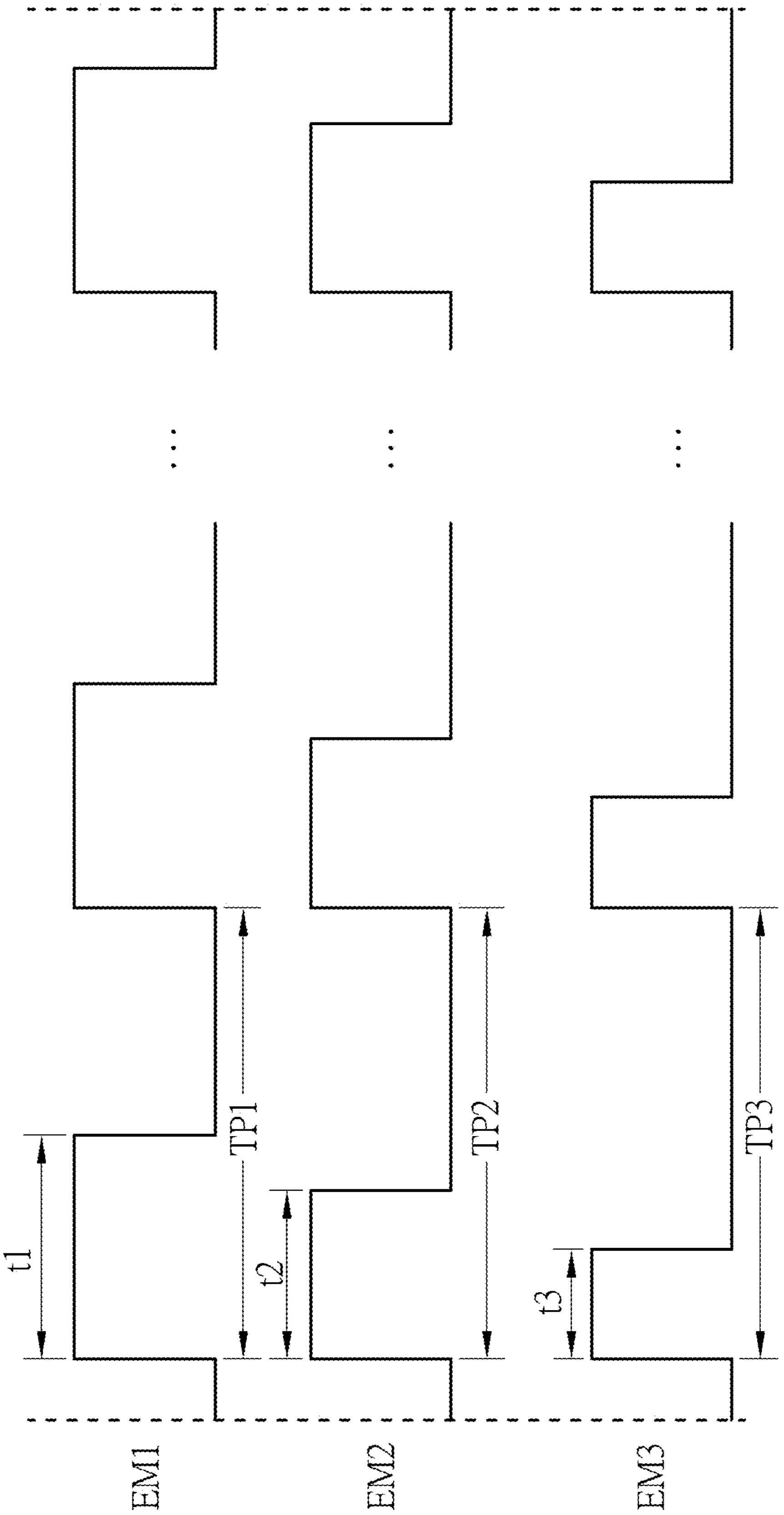
FIG. 5 is a schematic diagram showing waveforms of a first control signal, a second control signal and a third control signal according to an embodiment of the present disclosure.

Please refer to FIG. 5, which is a schematic diagram showing waveforms of a first control signal EM1, a second control signal EM2 and a third control signal EM3 according to an embodiment of the present disclosure. The first control signal EM1, the second control signal EM2 and the third control signal EM3 are configured for controlling the light-emitting times of the first sub-pixel circuit 11, the second sub-pixel circuit 12 and the third sub-pixel circuit 13, respectively. When a white image is displayed by the electronic device 1, the duty ratio of the first control signal EM1 may be greater than the duty ratio of the second control signal EM2, and may be greater than the duty ratio of the third control signal EM3. The duty ratio of the second control signal EM2 and the duty ratio of the third control signal EM3 may be the same or different. In one embodiment, the duty ratio of the second control signal EM2 may be greater than the duty ratio of the third control signal EM3, but the present disclosure is not limited thereto. Thereby, the duty ratio of the first sub-pixel circuit 11 (herein, the red sub-pixel circuit) can be individually increased to suppress the driving current of the red light, so as to achieve the effect of power saving.

Specifically, in FIG. 5, the period of the first control signal EM1 is TP1, the pulse duration is t1, and the duty ratio of the first control signal EM1 is the ratio of the pulse duration to the period (t1/TP1). Herein, the duty ratio of the first control signal EM1 is exemplarily equal to 50%. The period of the second control signal EM2 is TP2, the pulse duration is t2, and the duty ratio of the second control signal EM2 is the ratio of the pulse duration to period (t2/TP2). Herein, the duty ratio of the second control signal EM2 is exemplarily equal to 37.58. The period of the third control signal EM3 is TP3, the pulse duration is t3, and the duty ratio of the third control signal EM3 is the ratio of the pulse duration to the period (t3/TP3). Herein, the duty ratio of the third control signal EM3 is exemplarily equal to 25%. In FIG. 5, the values of the duty ratios of the first control signal EM1, the second control signal EM2 and the third control signal EM3 are only exemplarily, and the present disclosure is not limited thereto. The aforementioned white image may refer that the gray scale values of the first sub-pixel circuit 11, the second sub-pixel circuit 12 and the third sub-pixel circuit 13 are all 255, but the present disclosure is not limited thereto.

Figure 6:
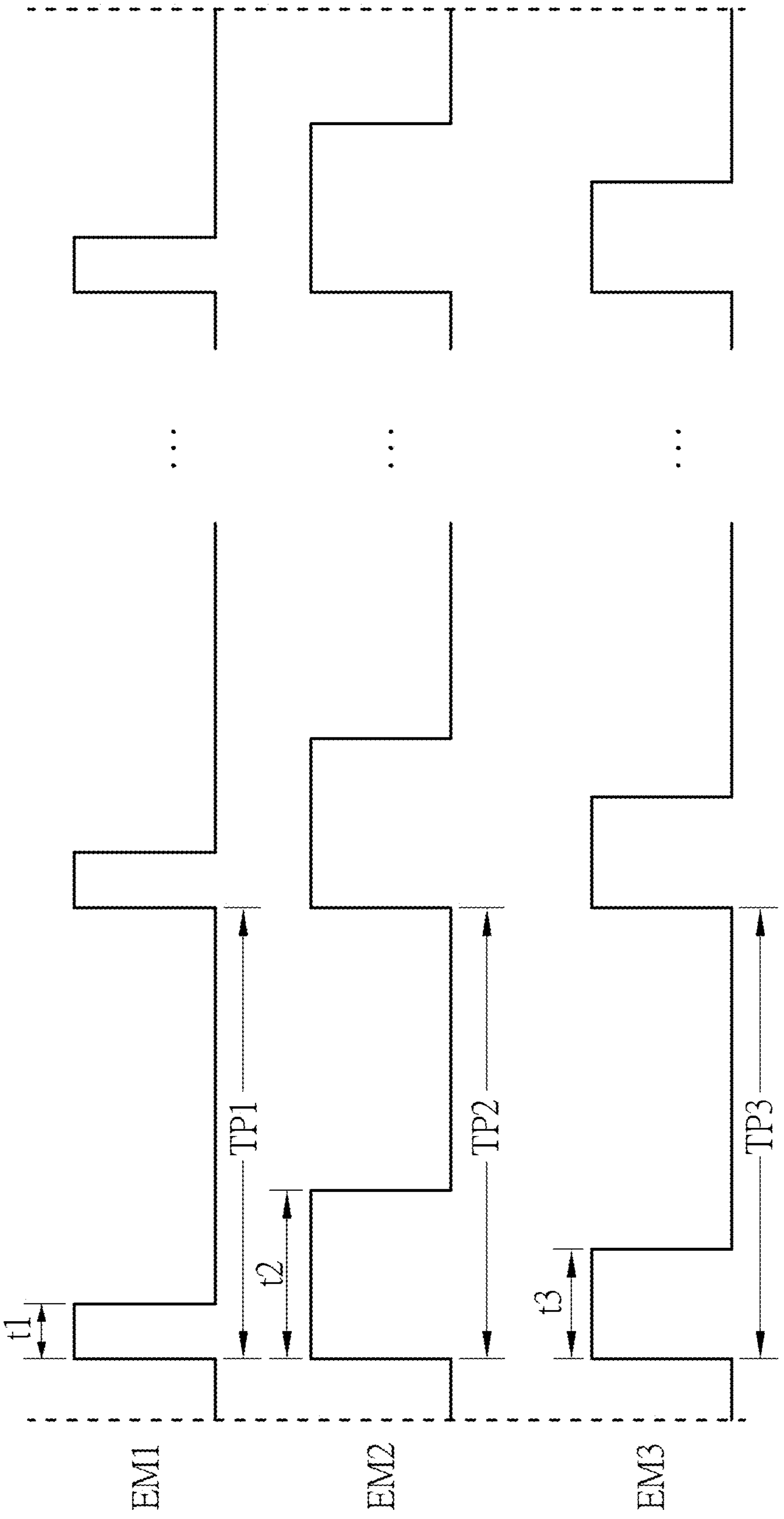
FIG. 6 is a schematic diagram showing waveforms of a first control signal, a second control signal and a third control signal according to another embodiment of the present disclosure.

Please refer to FIG. 6, which is a schematic diagram showing waveforms of a first control signal EM1, a second control signal EM2 and a third control signal EM3 according to another embodiment of the present disclosure. When a gray image is displayed by the electronic device 1, the duty ratio of the first control signal EM1 may be less than the duty ratio of the second control signal EM2, and may be less than the duty ratio of the third control signal EM3. The duty ratio of the second control signal EM2 and the duty ratio of the third control signal EM3 may be the same or different. In one embodiment, the duty ratio of the second control signal EM2 is greater than the duty cycle of the third control signal EM3, but the present disclosure is not limited thereto. By lowering the duty ratio of the first control signal EM1 and increasing the driving current of the first sub-pixel circuit 11, the degree of color shift of the red light can be reduced and the image quality can be improved.

Specifically, in FIG. 6, the duty ratio (t1/TP1) of the first control signal EM1 is exemplarily equal to 12.5%, the duty ratio (t2/TP2) of the second control signal EM2 is exemplarily equal to 37.5%, and the duty ratio of the third control signal EM3 (t3/TP3) is exemplarily equal to 258. The values of the duty ratios of the first control signal EM1, the second control signal EM2 and the third control signal EM3 in FIG. 6 are only exemplary, and the present disclosure is not limited thereto. The aforementioned gray image may refer that the gray scale values of the first sub-pixel circuit 11, the second sub-pixel circuit 12 and the third sub-pixel circuit 13 are all equal to or less than 63, but the present disclosure is not limited thereto.

Figure 7:
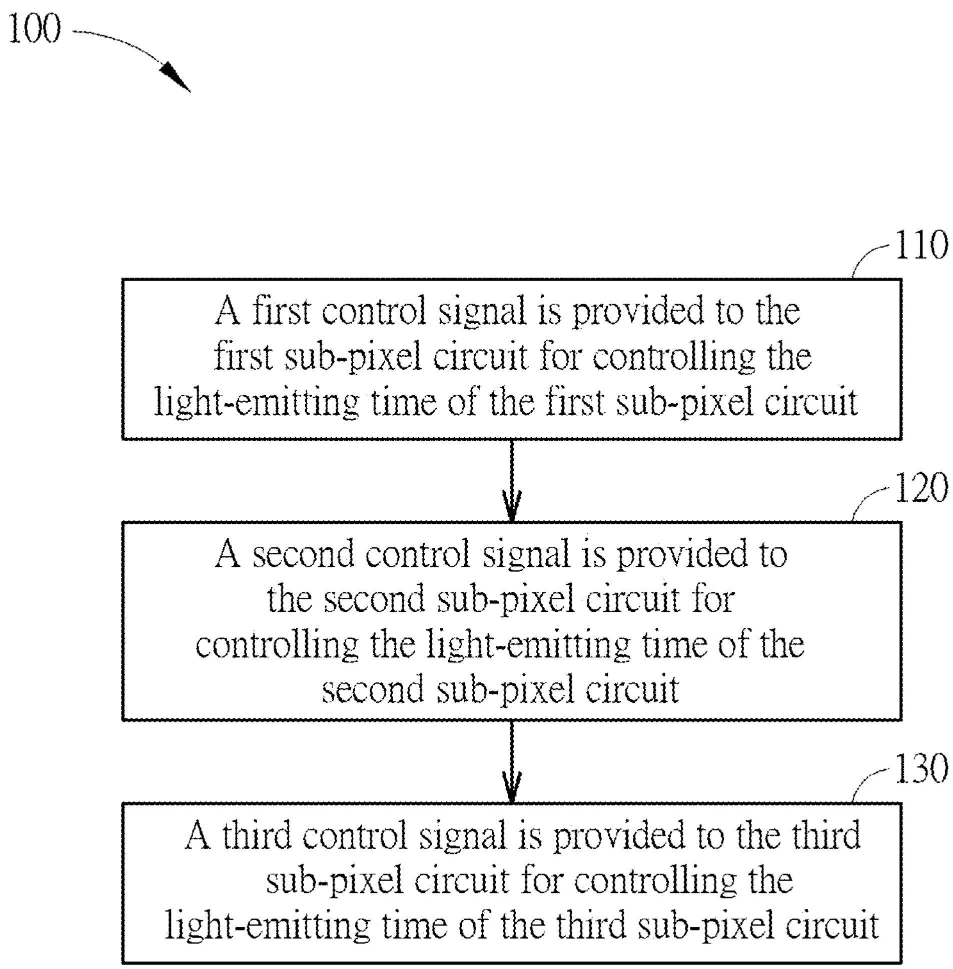
FIG. 7 is a step flow chart of a method for driving an electronic device according to another embodiment of the present disclosure.

The present disclosure further provides a method for driving an electronic device. The electronic device includes a pixel circuit and a data line. The pixel circuit includes a first sub-pixel circuit and a second sub-pixel circuit. The light color of the first sub-pixel circuit is different from the light color of the second sub-pixel circuit, and the data line is electrically connected with the first sub-pixel circuit and the second sub-pixel circuit. Please refer to FIG. 7, which is a step flow chart of a method 100 for driving an electronic device according to another embodiment of the present disclosure. The method 100 for driving the electronic device includes Step 110 and Step 120. In Step 110, a first control signal is provided to the first sub-pixel circuit for controlling the light-emitting time of the first sub-pixel circuit. In Step 120, a second control signal is provided to the second sub-pixel circuit for controlling the light-emitting time of the second sub-pixel circuit. Thereby, different control signals can be provided to control the light-emitting times of the sub-pixel circuits of different colors according to the characteristics of the light emitting elements of the sub-pixel circuits of different colors. The pixel circuit of the electronic device may further include a third sub-pixel circuit. The data line is electrically connected with the third sub-pixel circuit. The light color of the third sub-pixel circuit is different from the light color of the first sub-pixel circuit and the light color of the second sub-pixel circuit. In this case, the method 100 for driving the electronic device may further include Step 130. In Step 130, a third control signal is provided to the third sub-pixel circuit for controlling the light-emitting time of the third sub-pixel circuit. For details of the electronic device, the first control signal, the second control signal and the third control signal, references may be made to the above description and are not be repeated herein.

In the present disclosure, by using different control signal lines to control different sub-pixel circuits in the same pixel circuit, it can flexibly adjust the light-emitting times of the sub-pixel circuits of different colors according to the characteristics of the light emitting elements of the sub-pixel circuits of different colors, which can alleviate problems caused by using a unified duty ratio, such as color shift or high power consumption. In addition, the multiplexer that controls the data lines can be omitted, which can further simplify the design.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:

a pixel circuit comprising a first sub-pixel circuit, a second sub-pixel circuit and a third sub-pixel circuit, wherein the first sub-pixel circuit is a red sub-pixel circuit, the second sub-pixel circuit is a green sub-pixel circuit, and the third sub-pixel circuit is a blue sub-pixel circuit;

a data line electrically connected with the first sub-pixel circuit, the second sub-pixel circuit and the third sub-pixel circuit;

three control signal lines, wherein the three control signal lines are respectively a first control signal line, a second control signal line and a third control signal line, the first control signal line is electrically connected with the first sub-pixel circuit to provide a first control signal for controlling a light-emitting time of the first sub-pixel circuit, the second control signal line is electrically connected with the second sub-pixel circuit to provide a second control signal for controlling a light-emitting time of the second sub-pixel circuit, and the third control signal line is electrically connected with the third sub-pixel circuit to provide a third control signal for controlling a light-emitting time of the third sub-pixel circuit;

a first gate line electrically connected with the first sub-pixel circuit; and a second gate line electrically connected with the second sub-pixel circuit;

wherein when a gray image is displayed, a duty ratio of the first control signal is equal to 12.5%, a duty ratio of the second control signal is equal to 37.5%, and a duty ratio of the third control signal is equal to 25%;

wherein when a white image is displayed, a duty ratio of the first control signal is equal to 50%, a duty ratio of the second control signal is equal to 37.5%, and a duty ratio of the third control signal is equal to 25%.

2. The electronic device of claim 1, wherein the first sub-pixel circuit and the second sub-pixel circuit are arranged along an extending direction of the data line and overlap with each other along the extending direction of the data line.

3. The electronic device of claim 1, wherein the gray image refers that gray scale values of the first sub-pixel circuit, the second sub-pixel circuit and the third sub-pixel circuit are all equal to or less than 63.

4. A method for driving an electronic device, the electronic device comprising a pixel circuit, a data line, a first gate line and a second gate line, the pixel circuit comprising a first sub-pixel circuit, a second sub-pixel circuit and a third sub-pixel circuit, the first sub-pixel circuit being a red sub-pixel circuit, the second sub-pixel circuit being a green sub-pixel circuit, and the third sub-pixel circuit being a blue sub-pixel circuit, the data line being electrically connected with the first sub-pixel circuit, the second sub-pixel circuit and the third sub-pixel circuit, the first gate line being electrically connected with the first sub-pixel circuit, the second gate line being electrically connected with the second sub-pixel circuit, and the method for driving the electronic device comprising:

providing a first control signal to the first sub-pixel circuit for controlling a light-emitting time of the first sub-pixel circuit;

providing a second control signal to the second sub-pixel circuit for controlling a light-emitting time of the second sub-pixel circuit; and providing a third control signal to the third sub-pixel circuit for controlling a light-emitting time of the third sub-pixel circuit;

wherein when a gray image is displayed, a duty ratio of the first control signal is equal to 12.5%, a duty ratio of the second control signal is equal to 37.5%, and a duty ratio of the third control signal is equal to 25%;

wherein when a white image is displayed, a duty ratio of the first control signal is equal to 50%, a duty ratio of the second control signal is equal to 37.5%, and a duty ratio of the third control signal is equal to 25%.

5. The method of claim 4, wherein the gray image refers that gray scale values of the first sub-pixel circuit, the second sub-pixel circuit and the third sub-pixel circuit are all equal to or less than 63.

6. The method of claim 4, wherein the first sub-pixel circuit and the second sub-pixel circuit are arranged along an extending direction of the data line and overlap with each other along the extending direction of the data line.

* * * * *